United States Patent [19]
Esakoff et al.

[11] Patent Number: 6,002,563
[45] Date of Patent: Dec. 14, 1999

[54] PLUG-IN POWER MODULE INCORPORATING GROUND-FAULT DETECTION AND REPORTING

[75] Inventors: Gregory F. Esakoff, Huntington Beach; David W. Cunningham, Los Angeles, both of Calif.

[73] Assignee: Electronic Theatre Controls, Inc., Middleton, Wis.

[21] Appl. No.: 09/146,616

[22] Filed: Sep. 3, 1998

[51] Int. Cl.[6] .................................................. H02H 3/00
[52] U.S. Cl. .............................. 361/87; 361/42; 361/45; 361/115
[58] Field of Search ................................ 361/42, 45, 115, 361/87, 93.1

[56] References Cited

U.S. PATENT DOCUMENTS

| | | |
|---|---|---|
| 3,585,452 | 6/1971 | Goodwin ...................................... 317/18 |
| 3,812,400 | 5/1974 | Gryctko et la. ........................... 361/42 |
| 4,347,488 | 8/1982 | Mune et al. ................................. 335/9 |
| 4,366,520 | 12/1982 | Finke et al. ............................... 361/45 |
| 4,504,807 | 3/1985 | Nar .......................................... 335/61 |
| 5,180,886 | 1/1993 | Dierenbach et al. ...................... 174/66 |
| 5,349,273 | 9/1994 | Pacholok ................................. 315/307 |
| 5,352,958 | 10/1994 | Cunningham et al. ................. 315/291 |
| 5,432,455 | 7/1995 | Blades ..................................... 324/536 |
| 5,434,509 | 7/1995 | Blades ..................................... 324/536 |

*Primary Examiner*—Jeffrey Gaffin
*Assistant Examiner*—Stephen W Jackson
*Attorney, Agent, or Firm*—Sheppard, Mullin, Richter & Hampton LLP; James R. Brueggemann

[57] ABSTRACT

An improved plug-in power module for providing a controlled amount of electrical power to one or more remote lighting fixtures or other load is disclosed, the module being configured to sense a ground fault or other current imbalance at the load and, in response, both to trigger the module's circuit breaker to open and to report the occurrence of such a ground fault to a central location. The power module achieves these important functions without adding unduly to the module's complexity or size.

9 Claims, 7 Drawing Sheets

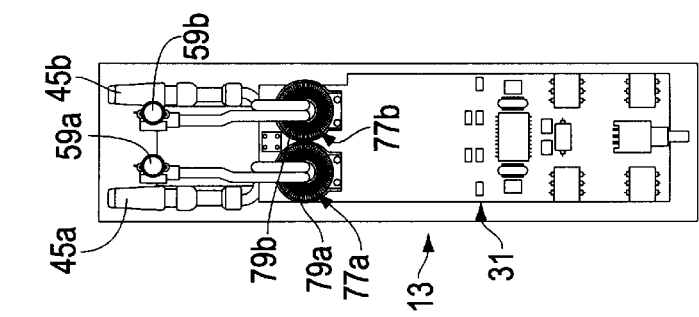
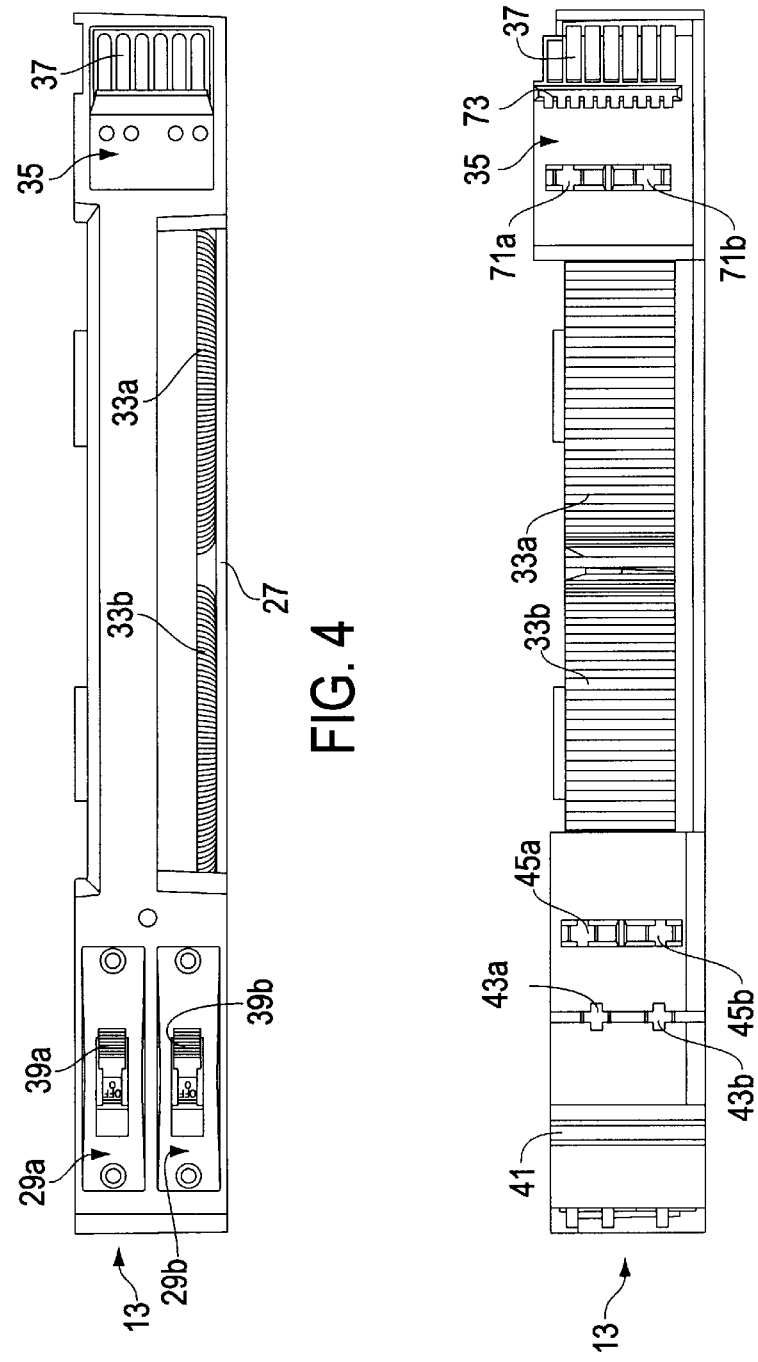

PLUG-IN POWER MODULE INCORPORATING GROUND-FAULT DETECTION AND REPORTING

BACKGROUND OF THE INVENTION

This invention relates generally to power modules for providing controlled electrical power to remote lighting fixtures and/or other loads and, more particularly, to power modules that can be slid into a rack to automatically connect to a supply of electrical power and to the loads to be controlled.

A plug-in power module of this particular kind is disclosed in U.S. Pat. No. 5,352,958 issued to David W. Cunningham et al. and entitled "Lighting Control System Dimmer Module With Plug-In Electrical Contacts." The disclosed power module includes a generally rectangular housing with one or more circuit breakers located at one end, a power device carrying one or more dimmer circuits located at an opposite end, and one or more toroidal chokes located in a middle section. The housing and the power device carry built-in electrical contacts positioned and configured to engage mating contacts in the rack when the power module is installed. One contact is for receiving electrical power, another contact is for supplying output power to the load being controlled, and a plurality of additional contacts are for receiving dimmer control signals and transmitting feedback/sensor signals. The various components of the power module are laid out efficiently within the housing, with minimal wastage of space and without the need for extraneous electrical conductors.

The power module described briefly above is highly effective in reliably controlling the delivery of electrical power to remote lighting fixtures or other loads, and it has achieved substantial commercial success. However, one deficiency of the power module is that it is not configured to detect ground faults or other causes of an imbalance in the electrical currents carried by the module's output power and return lines caused by current leakage to ground. Another deficiency is that, when a ground fault or other imbalanced condition occurs beyond a specified limit, no mechanism is provided for reporting that condition to a remote, central location.

It should, therefore, be appreciated that there is a need for an improved plug-in power module configured to sense a ground fault or other current imbalance and to trigger the module's circuit breaker, and that there further is a need for an improved plug-in power module configured to report the occurrence of such a ground fault to a remote location. The present invention satisfies these needs and provides further related advantages.

SUMMARY OF THE INVENTION

The present invention is embodied in an improved plug-in power module for supplying controlled electrical power to one or more lighting devices or other loads, in which the module incorporates a residual current device, or ground fault circuit interrupter, for sensing ground faults or other causes of an imbalance in the electrical current carried by the module's output power and load return lines, and for opening a circuit breaker when an imbalance exceeding a specified threshold is sensed. More particularly, the power module includes a housing having a rear side and a front side, with first and second plug-in electrical contacts mounted at the rear side, for connecting to input power and to power return, or neutral. Lines for input power and power return are connected to the residual current device, which senses any current imbalances. Power is supplied from the residual current device through an optional toroidal choke to a power device, which includes: 1) a dimmer circuit, 2) third and fourth plug-in electrical contacts facing the rear side of the housing, for providing output power to the load, and 3) one or more fifth plug-in electrical contacts facing the rear side of the housing, for carrying control and/or feedback signals. The power module is configured such that it can be slid into a rack, to automatically engage the module's plug-in electrical contacts.

In a more detailed feature of the invention, a fault test circuit is included, for selectively producing an imbalance between the electrical current carried by the output power line and the load power return line. In addition, the residual current device includes one or more toroids having openings through which pass both the output power line and the power return line.

In other more detailed features of the invention, the residual current device further is configured to generate a reporting signal when it senses an imbalance exceeding the specified threshold, for output via one of the one or more fifth plug-in electrical contacts. In addition, the residual current device produces a trip signal when it senses a current imbalance exceeding the specified threshold, for coupling through an optical isolator device, to open the circuit breaker.

Other features and advantages of the invention should become apparent from the following description of the preferred embodiment, taken in conjunction with the accompanying drawings, which illustrate, by way of example, the principles of the invention.

BRIEF DESCRIPTION OF THE DRAWINGS

FIG. 4 is a front elevational view of the power module of FIG. 3.

FIG. 5 is a rear elevational view of the power module of FIG. 3.

FIG. 6 is a sectional view of the power module, taken substantially in the direction of the arrows 6—6 in FIG. 3.

DESCRIPTION OF THE PREFERRED EMBODIMENT

Figure 1:
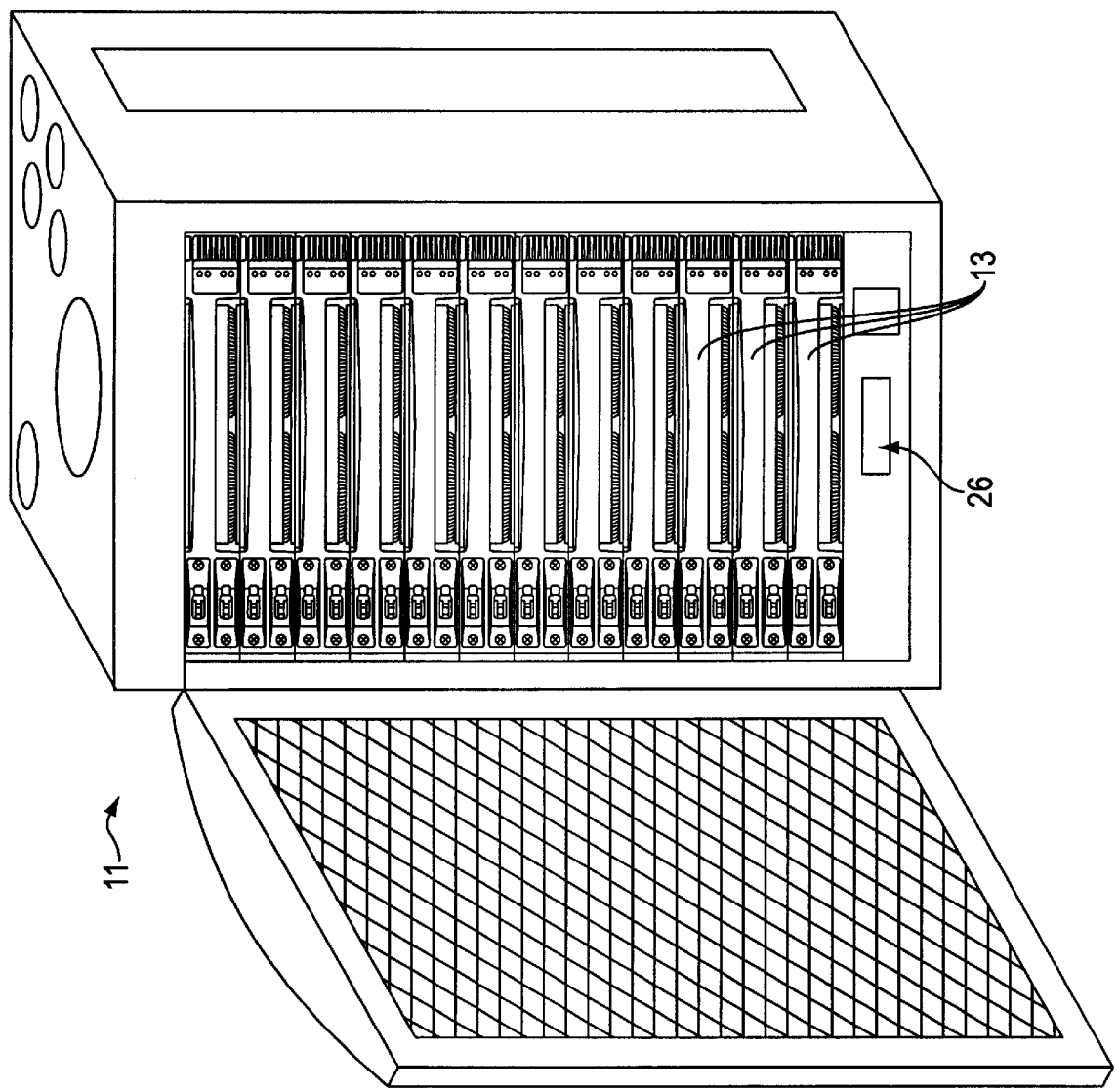
FIG. 1 is a perspective view of a rack for carrying a number of separate power modules embodying the present invention, with a door of the rack shown in its open position to reveal the power modules, each power module providing a controlled amount of power to two separate lighting fixtures, or groups of fixtures, or to other types of loads.
Figure 2:
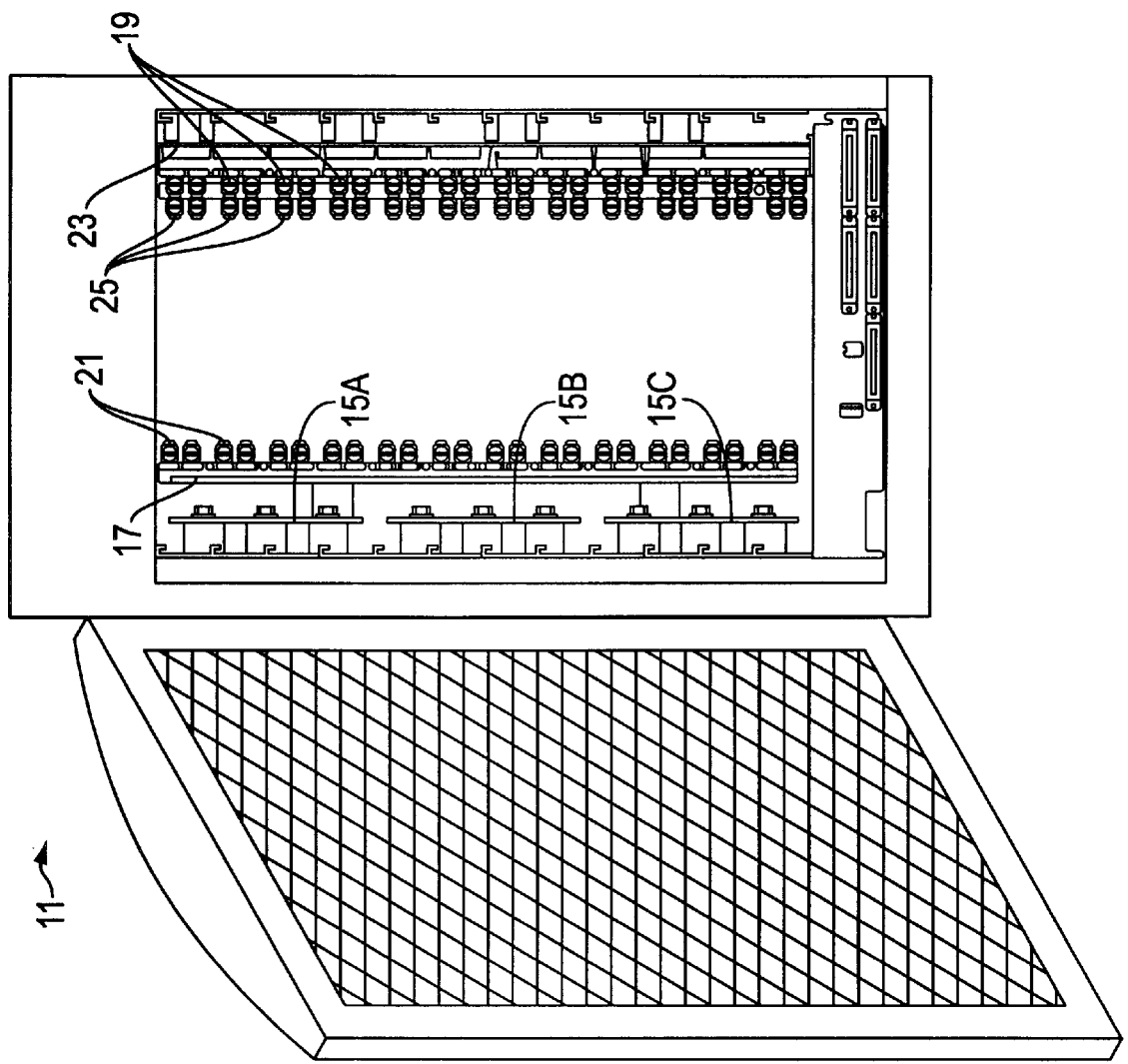
FIG. 2 is a front elevational view of the power module rack of FIG. 1, shown with the power modules removed.

With reference now to the drawings, and particularly to FIGS. 1 and 2, there is shown a rack 11 for carrying up to twelve power modules 13, each module providing a controlled amount of electrical power to two separate lighting fixtures, or groups of fixtures, or to other types of loads (not shown). The rack and power modules are part of a dimmable lighting system useful in theater, television and architectural lighting applications. FIG. 2 depicts the rack 11 with all twelve of the power modules 13 removed. The rack's exposed rear panel is depicted to include three vertically oriented input power buses 15A, 15B and 15C along the panel's left side, a vertically oriented power return bus 17, or neutral, alongside the input power buses, 24 load connectors 19 along the panel's right side, 24 load return connectors 21 adjacent to the power return bus 17, 24 ground (or chassis) connectors 25, and a printed circuit (PC) board 23 alongside the load connectors 19. The PC board distributes control signals and feedback signals to and from the power modules. The three input power buses each carry a separate phase of a standard three-phase ac power line. Alternatively, the buses may be combined for single- or split-phase operation. In addition, although the rack is shown to accommodate twelve power modules, it will be appreciated that other racks accommodating different numbers of modules alternatively could be used. It also will be appreciated that the power modules could alternatively be used to provide electrical power to loads other than dimmable lighting fixtures.

The rack 11 is configured such that each power module 13 can be slid conveniently into it, to engage one of the three power buses 15A, 15B or 15C, the power return bus 17, two of the load connectors 19, two of the load return connectors 21, and a plurality of signal conductors on the signal distribution PC board 23. A control module 26 is located at the bottom of the rack, for transmitting certain control signals via the PC board to the twelve power modules and for receiving back and evaluating certain feedback and reporting signals generated by the power modules.

FIGS. 3–7 depict one of the power modules 13 used in the rack 11 of FIG. 1. The module provides controlled amounts of electrical power to two separate lighting fixtures, or groups of fixtures, or to other loads (not shown). In the drawings, components of the power module that provide power for the first of the two loads are identified by reference numerals bearing the suffix a, and components that provide power for the second of the two loads are identified by reference numerals bearing the suffix b.

The power module 13 includes a generally rectangular, open-topped, die-cast aluminum housing 27, with: 1) two circuit breakers 29a and 29b stacked one above the other in the left section of the housing, 2) a residual current device 31 located immediately adjacent to the circuit breakers, 3) two toroidal inductors or chokes 33a and 33b arranged side-by-side, to the right of the residual current device 31, and 4) a power device 35 with a built-in heat sink 37 located in the right section of the housing. The circuit breakers 29a and 29b each include a finger switch 39a or 39b that is exposed through an opening in the front side of the housing 27, to allow the circuit breakers conveniently to be reset or switched ON or OFF. Optionally, a single circuit breaker could be used. In addition, in applications where the power modules are to be used to provide fixed amounts of electrical power to loads other than dimmable lighting fixtures, e.g., to electrical motors, the chokes 33a and 33b can be eliminated.

A plug-in terminal 41 for input electrical power is located on the rear side of the housing 27, at its left end. The terminal is sized and positioned to engage one of the three input power buses 15A, 15B or 15C (FIG. 2), depending on the particular slot of the rack 11 into which the module 13 is installed. Further, two plug-in terminals 43a and 43b for power return, or neutral, are located on the rear side of the housing, immediately adjacent to the terminal 41. The terminals 43a and 43b are sized and positioned to engage the power return, or neutral, bus 17 (FIG. 2). Similarly, plug-in terminals 45a and 45b for load power return are located on the rear side of the housing, immediately adjacent to the terminals 43a and 43b. The terminals 45a and 45b are sized and positioned to engage separate load return terminals 21 (FIG. 2).

The following description of the power module 13 relates expressly to the particular components that provide controlled power to the first of the two loads, e.g., a first lighting fixture (not shown). As mentioned above, these components are identified in the drawings by reference numerals bearing the suffix a. It will be understood that these components are largely duplicated for providing controlled power to the second of the two loads. These latter components are identified in the drawings by reference numerals bearing the suffix b.

The input power terminal 41 is connected by a lead frame 47 to a first input terminal 49a of the circuit breaker 29a, and it also is connected via a line 51 to a connector 53 associated with the residual current device 31. A first output terminal 55a of the circuit breaker 29a is connected via line 57a to the residual current device 31 and, in turn, through a connector 59a to a lead wire of the choke 33a. The other lead wire of the choke 33a is connected, in turn, to the power device 35, via a lead frame 61a, which projects leftward from the power device. The load terminal 45a is connected by line 63a to the residual current device 31 and, in turn, to a second input terminal 65a of the circuit breaker 29a. A second output terminal 67a of the circuit breaker 29a is connected via line 69a directly to the power return terminal 43a. Thus, the circuit breaker 29a can function both to switch the input power line and the power return line. Alternatively, the line 63a from the load return terminal 45a could be connected directly to the power return terminal 43a.

Figure 3:
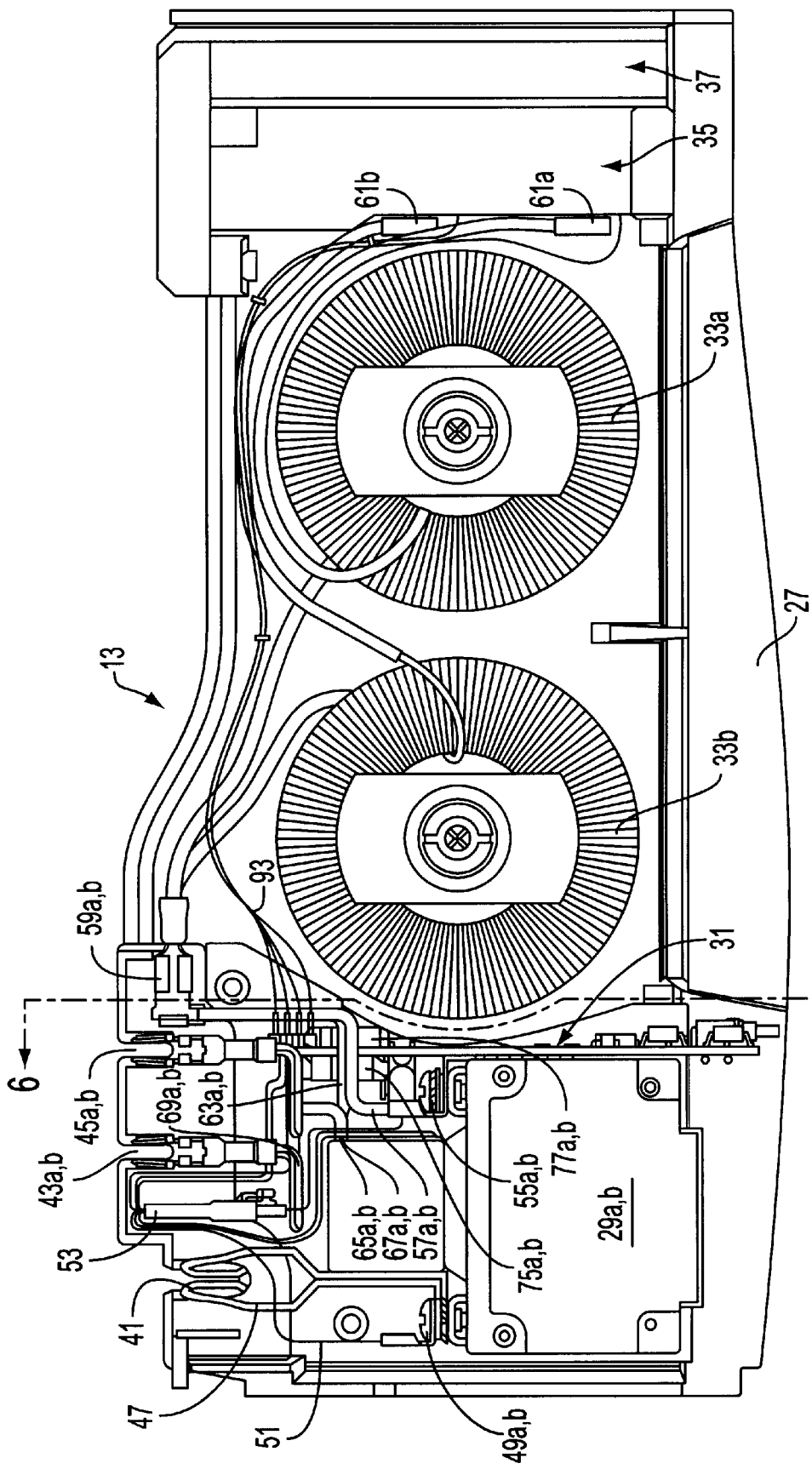
FIG. 3 is a top plan view of a power module embodying the present invention.
Figure 7:
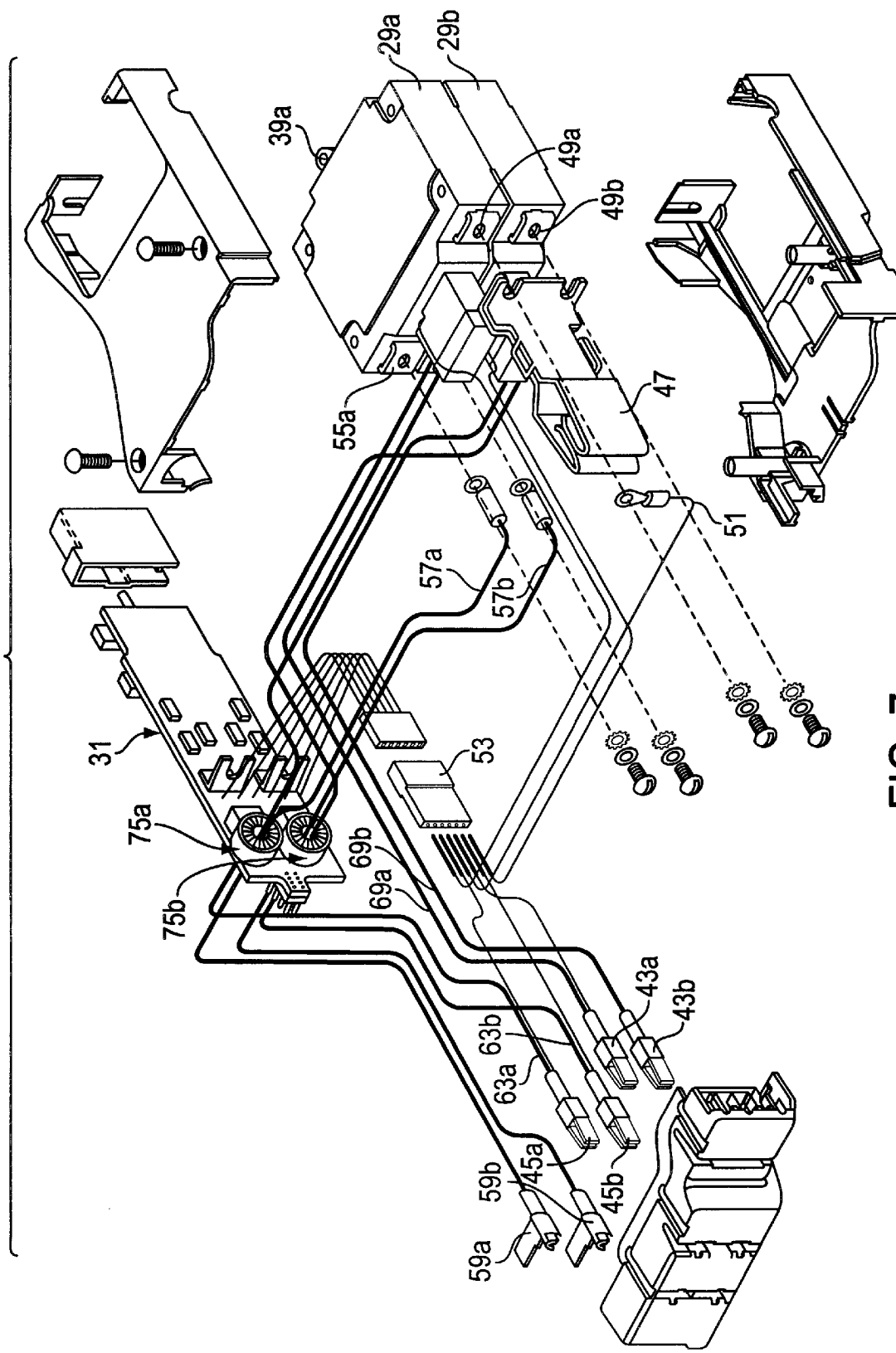
FIG. 7 is an exploded isometric view of the portion of the power module of FIG. 3 that incorporates the circuit breakers and the residual current device.

As best shown in FIGS. 3 and 5, the power device 35 includes plug-in load contacts 71a and 71b, which are sized and positioned to engage two load connectors 19, whereby controllably switched output power can be delivered to two separate lighting fixtures, or groups of fixtures, or to other loads (not shown). The power device 35 further includes a plurality of signal contacts 73, which are vertically arranged so as to engage the PC board 23, to carry control signals and feedback signals to and from circuitry included in the power device. The signal contacts 73 are attached directly to a PC board substrate (not shown) of the power device 35.

The power device 35 incorporates a dimmer relay circuit that includes silicon-controlled rectifiers (SCRs) and opto-isolator devices, for providing controllably switched electrical power through the load contacts 71a and 71b to the first and second lighting fixtures or groups of fixtures, or to other loads. Suitable configurations for the power device are disclosed in detail in U.S. Pat. No. 5,352,958, issued in the name of David W. Cunningham et al. and entitled "Lighting Control System Dimmer Module With Plug-In Electrical Contacts," and in U.S. Pat. No. 5,323,088, issued in the name of David W. Cunningham and entitled "Dimming Control Circuit."

It will be appreciated that the interconnections between the successive electrical components in the power module 13 are all made in a direct fashion, without the need for any extraneous electrical conductors. Each interconnection is made without the need for physically bypassing any obstructions or any electrical components from the same circuits. This result is achieved by arranging the components in the manner described, with the input power terminal 41, the power return terminals 43a and 43b, and the load return terminals 45a and 45b all located immediately adjacent to the circuit breakers 29a and 29b and the residual current device 31, at the left side of the power module 13, and further by arranging the load contacts 71a and 71b and the signal contacts 73 directly on the power device 35, itself, at the right side of the module.

The residual current device 31 senses electrical current imbalances that might occur in either of the power module's two channels, i.e., the channel that provides controlled current via the load contact to the first lighting fixture or other load, and the channel that provides controlled current via the load contact to the second lighting fixture or other load. The residual current device also senses connection of the load return terminals 45a and 45b to the load safety ground 25. The portion of the residual current device in the first of these two channels is depicted in FIG. 8, with the portion of the residual current device not depicted being substantially identical.

Figure 8:
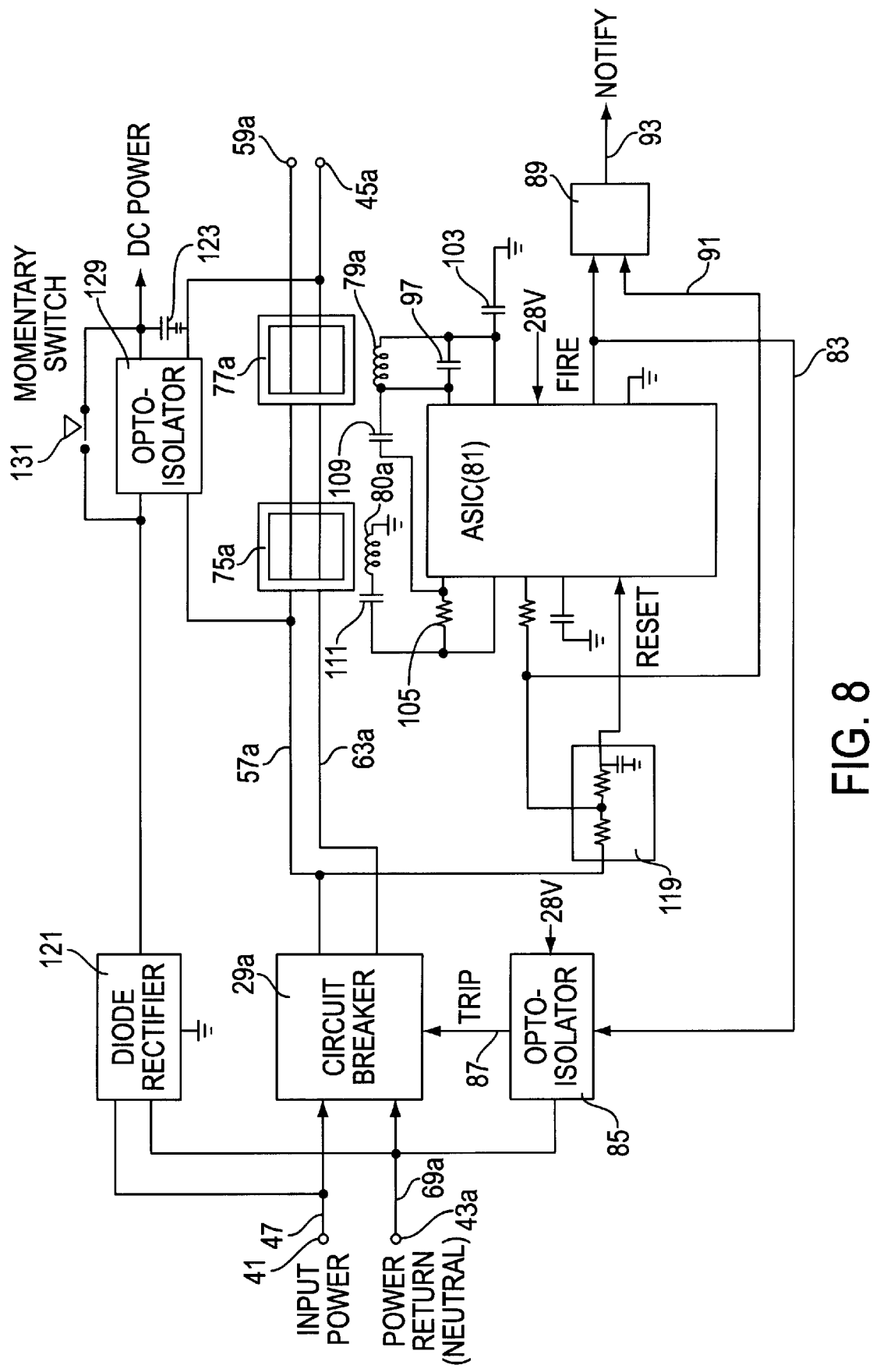
FIG. 8 is simplified schematic circuit diagram of the residual current device of the power module of FIG. 3.

As shown in FIG. 8 (as well as in FIGS. 3 and 6), the residual current device 31 includes first and second toroids 75a and 77a, both of which have an opening through which extends both the power line 57a and the load return line 63a, or neutral. Ordinarily, the electrical current carried on these two lines will be the same, so the electromagnetic fields they create will cancel each other. However, if a ground fault occurs, the resulting current imbalance will cause an electromagnetic field to be created. This field generates an electrical current in a coil 79a wrapped around the toroid 77a and in a coil 80a wrapped around the toroid 75a, for detection by an application specific integrated circuit (ASIC) 81.

Upon detecting a current imbalance exceeding a predetermined level, the ASIC 81 produces both a trigger signal and a reporting signal. The trigger signal is coupled on line 83 to an ac opto-isolator device 85 and, in turn, on line 87 to the circuit breaker 29a. This trips the circuit breaker, to open the input power line 57a and, optionally, the power return line 63a. In addition, an ac opto-isolator device 89 receives both the trigger signal on line 83 and the reporting signal on line 91, to produce a notify signal for transmission on line 93 to the power device 35. The power device, in turn, multiplexes this notify signal with other signals, for transmission via its signal contacts 73 to the control module 26 and to a remote facility. This transmitted notify signal indicates that a fault has occurred and that the circuit breaker for a particular lighting fixture or group of fixtures has been tripped.

Figure 9:
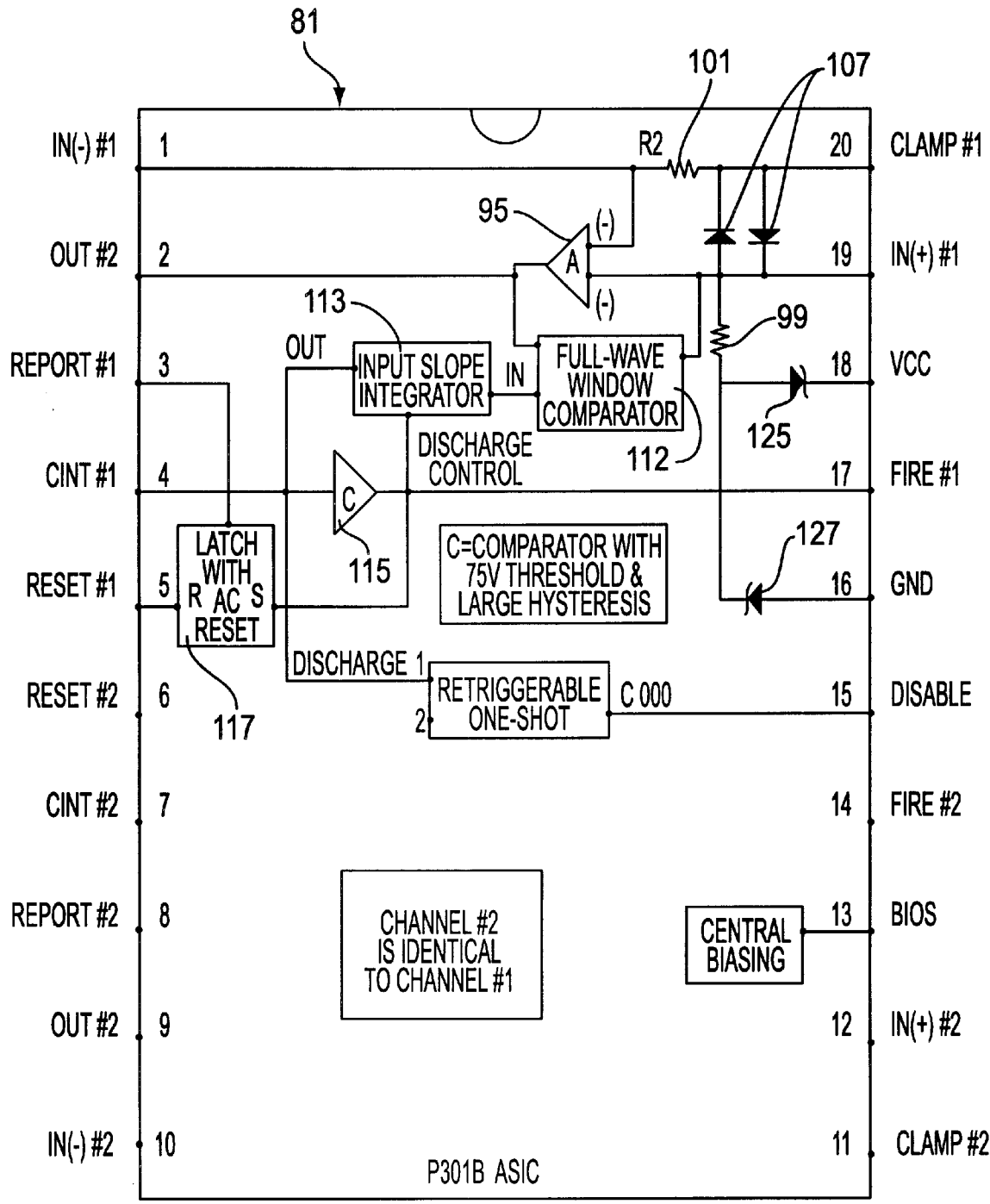
FIG. 9 is a simplified block diagram of the application specific integrated circuit (ASIC) of the residual current device of FIG. 8.

The ASIC 81 and associated external circuitry is shown in greater detail in FIG. 9. An operational amplifier (op amp) 95 functions to amplify the voltage developed in the coil 79a around the toroid 77a. In particular, this coil is connected in parallel with an external capacitor 97, with one end of the coil/capacitor circuit connected directly to the op amp's positive input terminal and through an internal resistor 99 to a bias voltage, and with the other end of the coil/capacitor circuit connected through an internal resistor 101 to the op amp's negative input terminal. An external capacitor 103 is connected between the op amp's positive input terminal and signal ground, to stabilize the bias voltage. An external resistor 105 is connected between the op amp's output terminal and negative input terminal, to provide the desired gain. In addition, two internal, reverse-biased diodes 107 are connected between the op amp's positive and negative input terminals, to limit excessive signal excursions, and an external capacitor 109 is connected in parallel with the input resistor 101, to enhance the op amp circuit's high-frequency gain.

In addition, the signal output by the ASIC's op amp 95 is connected through an external capacitor 111 to the coil 80a wrapped around the toroid 75a. The other end of the coil connects directly to signal ground.

The signal output by the ASIC's op amp 95 is supplied to a full-wave window comparator 112, whose output is supplied in turn to a dual-slope integrator 113. The integrator's output is supplied to a comparator 115, for comparison with a specified threshold, with large hysteresis. When the op amp's output signal exceeds the window comparator threshold, the integrator will begin to integrate. Eventually, if the condition continues, the comparator will determine that the integrator's output exceeds the specified threshold and will produce the trigger signal mentioned above, for output on line 83 to cause the opto-isolator device 85 to trip, or open, the circuit breaker 29a.

The trigger signal output by the ASIC's comparator 115 also is supplied internally to a resettable latch 117, which responds by producing the reporting signal mentioned above. The reporting signal is supplied on line 91, to cause the opto-isolator device 89 to output the notify signal. The reporting signal and notify signal continue until the circuit breaker 29a has been manually reset, at which time the presence of an ac voltage on the power line 57a is coupled through a low-pass filter 119 to reset the latch 117.

The residual current device 31 further incorporates a dc power supply 121 that converts the line voltage present on the power line 51 to dc power. This dc power supply preferably takes the form of a conventional full-wave diode rectifier. A capacitor 123 connects the dc voltage supply to signal ground, for dc filtering. Zener diodes 125 and 127, located within the ASIC 81, regulate the dc voltage to the desired level.

When a grounding of the neutral load line 63a occurs, a loop is formed through both toroids 75a and 77a, and a magnetic feedback path is established from the toroid 75a to the toroid 77a. This feedback connection is positive, which causes the op amp 95 to oscillate. The oscillation is sensed and handled in the same manner as a residual current fault.

To facilitate fault testing, the residual current device 31 further includes an opto-isolator device 129 and a normally closed test switch 131. Electrical current from the dc voltage supply normally passes through the switch, but when the switch is momentarily opened, the current is redirected through the internal light-emitting diodes of the opto-isolator device 129. This, in turn, causes a small current to flow from the input ac power line 57a to the ac power return line 63a, bypassing the toroids 75a and 77a. This creates a current imbalance, to simulate a ground fault at the load, and this imbalance is sensed by the ASIC 81, as described above. After the test switch 131 has been released, the circuit breaker 29a can be reset and the reported fault cleared.

It should be appreciated from the foregoing description that the present invention provides an improved plug-in power module configured to sense a ground fault or other current imbalance at the load and, in response, both to trigger the module's circuit breaker and to report the occurrence of such a ground fault to a remote location. The power module achieves these important functions without adding unduly to the module's complexity or size.

Although the invention has been disclosed in detail with reference only to the presently preferred embodiment, those of ordinary skill in the art will appreciate that various modifications can be made without departing from the invention. Accordingly, the invention is defined only by the following claims.

We claim:

1. A dimmer module for providing controlled electrical power to one or more remote loads, the dimmer module comprising:
- a housing having a rear side and a front side, opposite the rear side;
- first and second plug-in electrical contacts mounted at the rear side of the housing, for connecting to input power and to power return, respectively;
- a circuit breaker located within the housing and electrically connected to the first electrical contact;
- a residual current device located within the housing, configured to open the circuit breaker and to generate a reporting signal when it senses an imbalance in the electrical current carried by the first and second contacts exceeding a specified threshold;
- a toroidal inductor located within the housing and electrically connected to the residual current device; and
- a power device located within the housing and including
  - a dimmer circuit electrically connected to the toroidal inductor,
  - third and fourth plug-in electrical contacts facing the rear side of the housing, for connecting to a load, and
  - one or more fifth plug-in electrical contacts facing the rear side of the housing, for carrying control signals and the reporting signal generated by the residual current device;
- wherein the dimmer module is configured such that it can be slid into a rack and automatically engage the plug-in electrical contacts.

2. A dimmer module for providing controlled electrical power to one or more remote loads, the dimmer module comprising:
- a housing having a rear side and a front side, opposite the rear side, and a first end and a second end, opposite the first end;
- first and second plug-in electrical contacts mounted at the rear side of the housing, for connecting to input power and to power return, respectively;
- a circuit breaker located within the housing, adjacent to the first end of the housing, and electrically connected to the first electrical contact;
- a residual current device located within the housing, for sensing an imbalance in the electrical current carried by the first and second contacts and for opening the circuit breaker when it senses an imbalance exceeding a specified threshold;
- a toroidal inductor located within the housing, and electrically connected to the residual current device; and
- a power device located within the housing, adjacent to the second end of the housing, and including
  - a dimmer circuit electrically connected to the toroidal inductor,
  - third and fourth plug-in electrical contacts facing the rear side of the housing, for connecting to a load, and
  - one or more fifth plug-in electrical contacts facing the rear side of the housing, for carrying control signals;
- wherein the residual current device and the toroidal inductor are located between the circuit breaker and the power device, and the dimmer module is configured such that it can be slid into a rack and automatically engage the plug-in electrical contacts.

3. A dimmer module for providing controlled electrical power to one or more remote loads, the dimmer module comprising:
- a housing having a rear side and a front side, opposite the rear side;
- first and second plug-in electrical contacts mounted at the rear side of the housing, for connecting to input power and to power return, respectively;
- a circuit breaker located within the housing and electrically connected to the first electrical contact;
- a residual current device located within the housing, for sensing an imbalance in the electrical current carried by the first and second contacts, and for producing a trip signal when it senses a current_imbalance exceeding a specified threshold;
- an optical isolator device, responsive to the trip signal received from the residual current device, for opening the circuit breaker;
- a toroidal inductor located within the housing and electrically connected to the residual current device; and
- a power device located within the housing and including
  - a dimmer circuit electrically connected to the toroidal inductor,
  - third and fourth plug-in electrical contacts facing the rear side of the housing, for connecting to a load, and
  - one or more fifth plug-in electrical contacts facing the rear side of the housing, for carrying control signals;
- wherein the dimmer module is configured such that it can be slid into a rack and automatically engage the plug-in electrical contacts.

4. A dimmer module for providing controlled electrical power to one or more remote loads, the dimmer module comprising:
- a housing having a rear side and a front side, opposite the rear side;
- first and second plug-in electrical contacts mounted at the rear side of the housing for connecting to input power and to power return, respectively;
- a circuit breaker located within the housing and electrically connected to the first electrical contact;
- a residual current device located within the housing, for sensing an imbalance in the electrical current carried by the first and second contacts and for opening the circuit breaker when it senses an imbalance exceeding a specified threshold, wherein the residual current device includes a toroid through which passes both a line carrying electrical current supplied on the input power line and a line carrying electrical current returned on the power return line;
- a toroidal inductor located within the housing and electrically connected to the residual current device; and
- a power device located within the housing and including
  - a dimmer circuit electrically connected to the toroidal inductor,
  - third and fourth plug-in electrical contacts facing the rear side of the housing, for connecting to a load, and
  - one or more fifth plug-in electrical contacts facing the rear side of the housing, for carrying control signals;
- wherein the dimmer module is configured such that it can be slid into a rack and automatically engage the plug-in electrical contacts.

5. A power module as defined in claim 4, and further comprising a fault test circuit configured to selectively produce an imbalance between the electrical currents carried by the two lines passing through the toroid.

6. A dimmer module for providing controlled electrical power to one or more remote loads, the dimmer module comprising:

a housing having a rear side and a front side, opposite the rear side, and a first end and a second end, opposite the first end;

first and second plug-in electrical contacts mounted at the rear side of the housing, for connecting to input power and to power return, respectively;

a circuit breaker located within the housing, adjacent to the first end of the housing, and electrically connected to the first electrical contact;

a residual current device located within the housing for sensing an imbalance in the electrical current carried by the first and second contacts, wherein the residual current device is configured to trip the circuit breaker and to transmit a reporting signal to a remote location when it senses an imbalance exceeding a specified threshold;

a toroidal inductor located within the housing, and electrically connected to the residual current device; and a power device located within the housing, adjacent to the second end of the housing, and including
   a dimmer circuit electrically connected to the toroidal inductor,
   third and fourth plug-in electrical contact facing the rear side of the housing, for connecting to a load, and
   one or more fifth plug-in electrical contacts facing the rear side of the housing, for carrying control signals;

wherein the residual current device and the toroidal inductor are located between the circuit breaker and the power device, and the dimmer module is configured such that it can be slid into a rack and automatically engage the plug-in electrical contacts.

7. A dimmer module for providing controlled electrical power to one or more remote loads, the dimmer module comprising:

a housing having a rear side and a front side, opposite the rear side;

first and second plug-in electrical contacts mounted at the rear side of the housing, for connecting to input power and to power return, respectively;

a circuit breaker located within the housing and electrically connected to the first electrical contact;

a residual current device located within the housing, for sensing an imbalance in the electrical current carried by the first and second contacts, wherein the residual current device is configured to produce a trip signal, and to transmit a reporting signal to a remote location when it senses a current imbalance exceeding a specified threshold;

a toroidal inductor located within the housing and electrically connected to the residual current device;

a power device located within the housing and including
   a dimmer circuit electrically connected to the toroidal inductor,
   third and fourth plug-in electrical contact facing the rear side of the housing, for connecting to a load, and
   one or more fifth plug-in electrical contacts facing the rear side of the housing, for carrying control signals; and an optical isolator device, responsive to a trip signal received from the residual current device, for opening the circuit breaker;

wherein the dimmer module is configured such that it can be slid into a rack and automatically engage the plug-in electrical contacts.

8. A dimmer module for providing controlled electrical power to one or more remote loads, the dimmer module comprising:

a housing having a rear side and a front side opposite the rear side;

first and second plug-in electrical contacts mounted at the rear side of the housing, for connecting to input power and to power return, respectively;

a circuit breaker located within the housing and electrically connected to the first electrical contact;

a residual current device located within the housing, for sensing an imbalance in the electrical current carried by the first and second contacts, wherein the residual current device is configured to trip the circuit breaker and to transmit a reporting signal to a remote location when it senses an imbalance exceeding a specified threshold, and wherein the residual current device includes a toroid through which passes both a line carrying electrical current supplied on the input power line and a line carrying electrical current returned on the power return line;

a toroidal inductor located within the housing and electrically connected to the residual current device;

a power device located within the housing and including
   a dimmer circuit electrically connected to the toroidal inductor,
   third and fourth plug-in electrical contact facing the rear side of the housing, for connecting to a load, and
   one or more fifth plug-in electrical contacts facing the rear side of the housing, for carrying control signals;

wherein the dimmer module is configured such that it can be slid into a rack and automatically engage the plug-in electrical contacts.

9. A power module as defined in claim 8, and further comprising a fault test circuit configure to selectively produce an imbalance between the electrical currents carried by the two lines passing through the toroid.

* * * * *